United States Patent
Uoi et al.

(10) Patent No.: US 9,032,336 B2
(45) Date of Patent: May 12, 2015

(54) GESTURE INPUT SYSTEM, METHOD AND PROGRAM

(75) Inventors: Hirotaka Uoi, Shijonawate (JP); Katsutoshi Kimura, Shijonawate (JP)

(73) Assignee: Osaka Electro-Communication University, Osaka (JP)

( * ) Notice: Subject to any disclaimer, the term of this patent is extended or adjusted under 35 U.S.C. 154(b) by 829 days.

(21) Appl. No.: 12/440,150

(22) PCT Filed: Sep. 7, 2006

(86) PCT No.: PCT/JP2006/317730
§ 371 (c)(1),
(2), (4) Date: Dec. 28, 2009

(87) PCT Pub. No.: WO2008/029467
PCT Pub. Date: Mar. 13, 2008

(65) Prior Publication Data
US 2010/0138785 A1    Jun. 3, 2010

(51) Int. Cl.
*G06F 3/0481* (2013.01)
*G06F 3/01* (2006.01)

(52) U.S. Cl.
CPC ..................................... *G06F 3/017* (2013.01)

(58) Field of Classification Search
USPC ........... 715/834, 863, 810, 849, 852; 345/655
See application file for complete search history.

(56) References Cited

U.S. PATENT DOCUMENTS

| | | | | |
|---|---|---|---|---|
| 6,554,706 B2* | 4/2003 | Kim et al. | .......... | 463/36 |
| 7,663,605 B2* | 2/2010 | Fitzmaurice et al. | .......... | 345/173 |
| 7,809,214 B2* | 10/2010 | Disatnik et al. | .......... | 382/313 |
| 7,880,726 B2* | 2/2011 | Nakadaira et al. | .......... | 345/173 |
| 8,131,014 B2* | 3/2012 | Abe | .......... | 382/103 |
| 2002/0019258 A1* | 2/2002 | Kim et al. | .......... | 463/36 |
| 2007/0041058 A1* | 2/2007 | Disatnik et al. | .......... | 358/486 |
| 2007/0098263 A1* | 5/2007 | Furukawa et al. | .......... | 382/181 |
| 2007/0216642 A1* | 9/2007 | Kneissler | .......... | 345/156 |
| 2011/0269544 A1* | 11/2011 | Daniel | .......... | 463/37 |

FOREIGN PATENT DOCUMENTS

| | | |
|---|---|---|
| JP | UH05-033237 | 4/1993 |
| JP | H07-028591 | 1/1995 |

(Continued)

OTHER PUBLICATIONS

Yohei, Sasaki et al., "The User Interface which Utilize Whole Body Action," The 12th Workshop on Interactive Systems and Software (WISS 2004), pp. 155-156, 2004.
International Preliminary Report on Patentability for PCT/JP2006/317730 dated Sep. 7, 2006.
International Search Report for PCT/JP2006/317730 dated Oct. 3, 2006.

(Continued)

*Primary Examiner* — Namitha Pillai
(74) *Attorney, Agent, or Firm* — Foley & Lardner LLP

(57) ABSTRACT

The present invention provides an input interface that a human can operate naturally and intuitively using a human gesture (motion), by including means for acquiring motion information based on a gesture and input interface means for generating information for operating an object on a desktop of a computer on the basis of motion information. In this case, the motion information is matched against a template for recognizing a motion of a user and a matched event is outputted so that the object is operated. The object includes a pie menu in which a menu item is disposed in a circular form. A user is allowed to selects a desired menu item in the pie menu in accordance with an angle at which the user twists a wrist thereof.

21 Claims, 15 Drawing Sheets

(56) References Cited

FOREIGN PATENT DOCUMENTS

| | | |
|---|---|---|
| JP | H08-315154 | 11/1996 |
| JP | 10-031551 | 2/1998 |
| JP | 11-110125 | 4/1999 |
| JP | 2001-198110 | 7/2001 |
| JP | 2001-216069 | 8/2001 |
| JP | 2002-229730 | 8/2002 |
| JP | 2003-241639 | 8/2003 |
| JP | 2004-356819 | 12/2004 |
| JP | 2006-079533 | 3/2006 |
| WO | WO 2008/029467 | 3/2008 |

OTHER PUBLICATIONS

Office Action issued in JP2008-533010 mailed Nov. 4, 2009 (with English translation).

Kimura, K. et al., "Developing a gesture-based user interface," 68th Information Technology Society Conference, Mar. 2006, (including English translation), 5 pp.

Zhaosheng, Y., et al., "Human-Computer Interface Design for an In-vehicle Information System," Proceedings IEEE Intelligent Transportation Systems 2003, Oct. 2003, Issue 12-15, pp. 1417-1421.

* cited by examiner (A)

| PARAMETER | DESCRIPTION |
|---|---|
| POS : Position | POSITION |
| VEL : Velocity | VELOCITY |
| ACC : Acceleration | ACCELERATION |
| DIS : Distance | DISTANCE |
| DIR : Direction | DIRECTION |

```
<JUNP>      // START TEMPLATE
head@ACC : 5000_N
head@DIR : N_N/N_N/0.7_N
pelvis@ACC : 5000_N
pelvis@DIR : N_N/N_N/0.7_N
rtoes@POS : N_N/N_N/100_N
ltoes@POS : N_N/N_N/100_N
-JUNP       // END TEMPLATE
rtoes@POS : N_N/N_N/50_N
ltoes@POS : N_N/N_N/50_N
```

(A)  (B)

GESTURE INPUT SYSTEM, METHOD AND PROGRAM

CROSS-REFERENCE TO RELATED APPLICATIONS

The present application is a U.S. national stage application under 35 USC §371 claiming the benefit of International Application No. PCT/JP2006/317730, filed on Sept. 7, 2006, the entire contents of which are incorporated herein by reference in their entirety.

TECHNICAL FIELD

The present invention relates to an interface for input to a computer.

BACKGROUND ART

While various apparatuses such as a keyboard, a mouse, and a touch panel have been used as an interface for input to a computer, other various input interfaces have also been proposed so as to respond to voices of various users.

Under these circumstances, multi-modal interfaces have been noted in recent years. "Multi-modal" refers to multiple modes and a multi-modal interface refers to an interface using multiple media. Typically, a multi-modal interface refers to an interface combining voice information and video information. Also, nonverbal interfaces using nonverbal information rather than using voice information are known (Non-Patent Document 1).

[Non-Patent Document 1] Takao Kurokawa "Non-verbal Interface Human Communication Engineering Series," Ohmsha, 1994.

DISCLOSURE OF INVENTION

Problems to be Solved by the Invention

As for nonverbal interfaces, an input interface using a gesture such as a human gesture or hand gesture has been proposed. For example, an input interface used when playing a game using motions on a whole-body in the field of amusement is known. Also, use of gestures in an interface for input to a general computer has also been studied; however, the related-art gesture input has a room for improvement in terms of ease of use.

The present invention was made in view of the foregoing. Accordingly, an object of the present invention is to provide an input interface that uses human gestures (motions) and is natural for a human and operable intuitively.

Means for Solving the Problems

In order to solve the above-mentioned problem, a gesture input system according to the present invention includes: motion information acquisition means for acquiring motion information based on a gesture; and input interface means for generating information for operating an object on a desktop of a computer on the basis of motion information acquired by the motion information acquisition means.

The gesture input system preferably further includes template storage means for storing a template for recognizing a motion of a user. The input interface means preferably includes: template matching means for matching motion information acquired by the motion information acquisition means against a template stored in the template storage means; event output means for outputting an output event associated with a template matched by the template matching means; and operation information generation means for generating information for operating an object on a desktop on the basis of an output event outputted by the event output means.

Also, the object preferably includes a pie menu in which a menu item is disposed in a circular form, and a user preferably selects any menu item in the pie menu by a predetermined gesture.

Also, the operation information generation means preferably generates information for selecting a menu item in the pie menu in accordance with an angle at which a user twists a wrist thereof. Also, the pie menu is preferably layered.

A gesture input method according to the present invention includes: a motion information acquisition step of acquiring motion information based on a gesture; and a step of generating information for operating an object on a desktop on the basis of motion information acquired in the motion information acquisition step.

A program according to the present invention is characterized in that the program causes a computer to perform the steps of the gesture input method according to the present invention. The program according to the present invention is distributed as a program product. The program is installed or loaded into a computer via various storage media such as an optical disk, e.g., a CD-ROM, a magnetic disk, and a semiconductor memory or by downloading the program via a communication network or the like.

In this specification and the like, a "means" does not simply mean a physical means and a function of the means may be realized by software. Also, a function of one means may be realized by two or more physical means or functions of two or more means may be realized by one physical means.

Advantages

By adopting the gesture input system according to the present invention, it is made possible to provide an input interface that a human can operate naturally and intuitively using a gesture, which is one of information communication means that we usually use in a casual manner. Also, an input interface that does not require any special training and is easy to use for anyone is realized. Accordingly, such an input interface can become a base technology for next-generation input interfaces.

BEST MODE FOR CARRYING OUT THE INVENTION

An embodiment of the present invention will be described in detail with reference to the accompanying drawings. Like elements are assigned like reference numerals and will not be repeatedly described.

FIG. 1 is a block diagram showing an overall configuration of a gesture input system 100 according to the present invention. As shown in FIG. 1, the gesture input system 100 is a system that functions as motion information acquisition means and input interface means, and includes multiple cameras 10, a motion capture system 12, a workstation 14, a realtime engine 16, an interface system 18, and a client computer (not shown).

The motion capture system 12 is a system that acquires three-dimensional information indicating a motion of a capture target from sensors or the like attached to the whole-body of a human who is the capture target. In this embodiment, the motion capture system 12 photographs the capture target from different directions using special spheres (markers) for reflecting light and the multiple cameras 10 provided in predetermined positions and combines two-dimensional images (two-dimensional coordinate positions of the markers) obtained from the cameras to calculate data indicating the coordinates of the markers in a three-dimensional space to acquire motion information.

The workstation 14 includes data processing software for shaping and converting capture data collected by the motion capture system 12. This data processing software executes processes such as conversion (re-construction) of two-dimensional information into three-dimensional information and interpolation or deletion for correcting data missed when a marker falls into a blind spot of a cameral 10. This makes it possible to acquire capture data in real time.

The realtime engine 16 is a processing mechanism for generating the flow of data in real time. The interface system 18 is allowed to acquire capture data in real time through the mediation of the realtime engine 16.

The interface system (input interface means) 18 outputs a motion event to a client (not shown) on the basis of capture data acquired from the realtime engine 16. The client performs a desktop operation or the like on the basis of the acquired motion event. The details will be described later.

In this embodiment, Vicon8i is used as the motion capture system 12. The workstation 14 includes Vicon iQ. Tarsus is used as the realtime engine 16.

Dedicated or general-purpose computers including a processing unit such as a CPU, a memory such as a ROM or a RAM, an external storage unit for storing various types of information, an input/output interface, and a communication interface, and the like may be used as the motion capture system 12, workstation 14, realtime engine 16, interface system 18, and client computer. Also, the systems and the like may be each made up of a single computer or multiple computers. Conversely, a single computer may include the functions of the multiple systems.

FIG. 2 includes drawings showing the disposition of the markers attached to the whole-body of the capture target. In this embodiment, the markers are disposed in 44 locations on the whole-body as shown in FIG. 2; however, the disposition and number of the markers are not limited to those shown in FIG. 2.

In this invention, the real time nature at the time when capture data is used as an input interface is an important factor. Accordingly, it is preferable to omit unnecessary information to reduce the weight of the capture data while maintaining the quality of motion capture. For example, by using body data calculated by adding information about the skeleton of the human to information acquired by the markers attached to the whole-body of the capture target, the amount of information is made smaller than the amount of marker data and information about the motion of the human is more directly used.

FIG. 3 is a drawing showing a coordinate system of capture data acquired by the motion capture system 12. As shown in FIG. 3, the capture data is acquired as data based on a global coordinate system using the center of a capture area as the origin point.

FIG. 4 is a diagram showing a structure of capture data acquired by the motion capture system 12. As shown in FIG. 4, as for capture data, data 22 including a frame number 20 of the currently acquired data, a subject name that has been acquired by each marker and indicates the name of the measurement target, a label name indicating which marker's information the information is, and information indicating measured three-dimensional coordinates is acquired for each frame.

FIG. 5 is a flowchart of a motion recognition process performed by the interface system 18. The interface system 18 acquires data from the realtime engine 16 in real time (S31), and then performs a preprocess of shaping the data so that the data is easily used for motion recognition (S32). Subsequently, the interface system 18 matches the data against a template prepared in advance so as to recognize an intended motion (S33). If the data is matched with the template, the interface system 18 outputs a motion event associated with the template (S34). Hereafter, the process steps will be described in detail.

(Step S32: Preprocess)

It is difficult to directly use the capture data acquired from the realtime engine 16 for motion recognition. For this reason, by performing a preprocess, that is, by performing normalization and coordinate conversion, the capture data is converted into data that is easy to use for motion recognition.

(Normalization)

In order to directly use capture data acquired from the realtime engine 16, templates created for individuals must be prepared, since the figures of humans are not uniform. For this reason, the capture data is corrected into a predetermined normal figure so that individual differences are accommodated. By doing so, whatever type of figure a human has, data about the human is handled as data about a human having an identical figure. This makes it possible to apply a single template to a motion. The template will be described later.

FIG. 6 includes diagrams showing examples of normalization. FIG. 7 is a diagram showing an example of a tree structure. FIGS. 6(A) to 6(C) are pieces of body data indicating figures specific to individuals and FIG. 6(D) is a piece of body data indicating a normal figure provided as a base model in advance. The pieces of body data shown in FIGS. 6(A) to 6(C) are subjected to this normalization process so that the pieces of body data are corrected so as to come close to the normal figure shown in FIG. 6(D).

Specific normalization steps are as follows.

First, areas of a human body acquired from body data are defined in advance using a tree structure shown in FIG. 7. Also, by defining the body height of a base model and the distance between each parent node and child node in the tree structure, the ratio between the upper-body and lower-body and the lengths of limbs are determined in advance.

Next, a basic pose of the capture target is acquired to obtain characteristics of the capture target. Then, the distances between each parent and child in the tree structure obtained from data about the body of the capture target are obtained on the basis of the defined body height of the base model so as to obtain the conversion ratio for each node. This process is performed when initialization is performed when capturing a motion of each capture target.

During the motion capture, a vector (unit vector) based on the positional relation between a parent and a child in the tree structure is obtained with respect to acquired data for each acquisition frame, and the positional relation is modified on the basis of the conversion ratio and the vector and is matched with the base model. As for a foot and toes, (foot and toes shown in FIG. 7), it is preferable to consider only an influence on an X axis component and a Y axis component (except for a height component) with respect to a parent node (femur shown in FIG. 7) in order to prevent a swaying of the foot.

(Coordinate Conversion)

Data acquired from the realtime engine 16 is data based on the global coordinate system using the center of the capture area as the origin point. For this reason, coordinate conversion is performed, that is, the coordinate system of this data is converted into a local coordinate system fixing the vision line direction (orientation of the body) and using the standing position as the origin point. For example, this coordinate conversion is performed as follows. That is, first, an X axis component and a Y axis component of the acquired data except for a Z axis component (height component) thereof are converted into a coordinate system using a waist, which is the center of the capture target, as the origin point. Next, coordinate conversion is performed so that the vision line direction (orientation of the body) becomes the Y axis forward direction.

By performing the above-mentioned coordinate conversion, the center of the capture target is used as the origin point and the vision line direction is fixed to the Y axis forward direction in the local coordinate system. Accordingly, it is possible to evaluate each acquired data uniformly without being influenced by the standing position or the orientation of the body even if the capture target makes a motion in any direction in any place.

Also, since motions involving travel, such as a walk and a run, may be evaluated more effectively using data based on the global coordinate system, it is desirable that data based on the global coordinate system be also available when recognizing a motion.

(Step S33: Template Matching)

In this embodiment, in order to make it easy to use a recognition result when constructing an interface on the basis of the recognition result, the recognition result is generated as a motion event and transmitted to a client. At that time, whether the acquired data is matched with any of templates previously stored in a storage unit (template storage means) is determined (template matching means). If the acquired data is matched with any template, an event corresponding to the template is generated (event output means). Also, by preparing a start template and an end template, it is made possible to explicitly recognize the start and end of a motion to acquire an intended motion event. That is, if the acquired data is matched with the start template in a state in which an event can be generated, a motion start event is generated and the state is shifted to a state in which an event cannot be generated (state transition). Also, if the acquired data is matched with the end template in a state in which an event cannot be generated, a motion end event is generated and the state is shifted to a state in which an event can be generated.

FIG. 8 is a drawing showing motions corresponding to the start template and end template. The lateral axes shown in FIG. 8 represent the time. Here, it is assumed that the capture target makes a jump motion (FIG. 8(A)). In this case, if acquired data is matched with a template corresponding to the start of a jump motion (JUMP_ON: true in FIG. 8(B)), an motion start event is generated (true in FIG. 8(D)). Thereafter, no subsequent motion start event is generated until the acquired data is matched with the end template and thus a motion end event is generated. If a motion end event is generated (JUMP_OFF: false in FIG. 8(C)), the state becomes a state in which a motion start event can be generated (false in FIG. 8(D)).

FIG. 9 is a drawing parameters used when performing template-matching. In this embodiment, five elements, that is, position, velocity, acceleration, distance, and direction are used as parameters when performing template-matching. The interface system 18 acquires these parameters for each frame. In this case, the interface system 18 acquires the parameters such as velocity acquired by performing a calculation extending over multiple frames. Thus, the interface system 18 is allowed to grasp the flow of a motion.

FIG. 10 is a template corresponding to a jump motion as an example of a template. Each template includes a start template starting with "<event name>" and an end template starting with "−event name". A label of body data, an evaluation parameter, and an evaluation value are sequentially described with respect to each of the start template and end template. The respective meanings of rows of the template corresponding to a jump motion are as follows.

1: A start template corresponding to a "JUMP" motion
2: The acceleration of the head is equal to or more than the threshold thereof
3: The vector of the head is equal to or more than the threshold thereof in the Z direction
4: The acceleration of the waist is equal to or more than the threshold thereof
5: The vector of the waist is equal to or more than the threshold thereof in the Z direction
6: The position of the right leg is equal to or more than the threshold thereof in the Z direction
7: The position of the left leg is equal to or more than the threshold thereof in the Z direction (whether the head and waist are raised with accelerations more than the thresholds thereof and both legs are floating is determined on the basis of the above-mentioned start template, and if all these conditions are met, the start of a jump is determined.)

8: An end template of "JUMP"
9: The position of the right leg is equal to or less than the threshold in the Z direction
10: The position of the left leg is equal to or less than the threshold in the Z direction (whether both legs are landed on the ground is determined on the basis of the above-mentioned end template, and if all these conditions are met, the end of the jump is determined.)

Next, an input interface process (operation information generation means) for generating information for performing a cursor operation or a window operation in real time using motion information acquired by the gesture input system 100 will be described. In this embodiment, a window operation performed under a virtual desktop environment using a hand gesture will be described.

In this embodiment, two cursors are displayed on a screen (desktop), the cursors are associated with the left hand and right hand, respectively, in advance, and the cursors are operated on the basis of information indicating the coordinates of the right and left hands. Each cursor has a normal state and a selected state and the state of each cursor is shifted from the normal state to the selected state on the basis of a finger-pointing operation. By providing each cursor with the normal state and selected state, an unintended event can be prevented from occurring during operation. Also, by making a wrist twisting motion when the cursor is placed in the selected state, an operation (hereafter referred to as a "selected operation") equivalent to a click of a mouse is performed. Also, by moving a hand in the selected operation state, an operation equivalent to a drag is performed.

FIG. 11 includes drawings showing a cursor operation based on gesture input. As shown in FIG. 11(A), a cursor is moved with the palm of a hand directed downward. Then, by twisting the wrist when the cursor is placed in the selected state, the selection operation is performed (FIG. 11(B)).

As another embodiment, the selected operation may be performed by making a punch motion using one hand while operating the cursor on the basis of information indicating the coordinates of the other hand. In this case, the selected operation is preferably performed regardless of the state (normal state, selected state) of the cursor.

Next, as an operation method that any existing desktop interface does not have, a method for operating each object (window) without performing a cursor operation will be described.

FIG. 12 includes drawings showing an operation method for changing the window size using both hands. As shown in FIG. 12(B), by making a gesture in which the right and left hands are aligned, the window is shifted to a size change state. By increasing the width between the left hand and right hand in the size change state, the window size is increased (FIG. 12(A)). By reducing the width between the left hand and right hand, the window size is reduced (FIG. 12(C)). The window size can be changed in three ways, that is, the lateral width thereof, the longitudinal width thereof, and both the longitudinal and lateral widths thereof can be changed. By moving both hands laterally, the lateral width is changed. By moving both hands longitudinally, the longitudinal width is changed. By moving both hands obliquely, both the longitudinal and lateral widths are changed.

FIG. 13 includes drawings showing an operation method for changing the window size using one hand. First, the window is shifted to the size change state by twisting the wrist, then, the coordinates of the hand in the size change state are used as the base point (FIG. 13(B)), and then the window size is increased by moving the hand toward the front of the base point (FIG. 13(A) or the window size is reduced by moving the hand toward the rear of the base point (FIG. 13(C)).

In addition to the changes in the window size, various operations can be realized using gesture input. For example, a specified window is maximized by making a punch motion, and the window is restored to its original size by making a punch motion in the maximized state. Also, by making a gesture for clearing away the window, the window can be moved in the direction in which the hand is moved. Also, by making a motion for waving a hand, a specified window can be closed.

Also, by using a gesture, not only information including the upward and downward directions and the left and right directions but three-dimensional information also including the forward and backward directions can be inputted. Accordingly, a movement toward the depth between objects can also be made. For example, among stacked windows, the back window is displayed in the front. In contrast, the front window can be hidden on the back.

Next, a process of selecting a pie menu using this gesture input will be described.

FIG. 14 includes drawings showing an example of a pie menu. As shown in FIG. 14(A), a pie menu includes multiple pies (menu items) forming a circle and the pies are displayed in such a manner that the circle is divided from the center thereof. While the number of menu items in a pie menu is limited and thus selectable functions are limited, more functions can be included by providing pie menus in layers as shown in FIG. 14(B). As for menu items that are each subdivided, the names thereof are provided with predetermined marks, such as ▲, indicating that the menu items each have a menu in a lower layer.

While this pie menu is not displayed on the screen during normal operation, it is displayed in a popup form on the basis of a user's motion such as raising of the right leg.

FIG. 15 includes drawings showing an operation method for selecting a menu in a pie menu. As shown in FIG. 15, a user selects each pie using the angle of a wrist thereof. For example, as shown in FIG. 15(B), when the palm of the hand is directed downward, the upper pie is selected. Also, as shown in FIG. 15(A), by twisting the wrist clockwise, a pie is selected clockwise in accordance with the turned angle. Also, as shown in FIG. 15(C), by twisting the wrist counterclockwise, a pie is selected counterclockwise in accordance with the turned angle. After the user selects the desired pie, the user confirms the currently selected pie by making a punch motion and then performs a process corresponding to a menu item of the pie.

As another embodiment of menu selection in a pie menu, a predetermined pie has been already selected immediately after a pie menu pops up, and by twisting the wrist clockwise, a pie may be sequentially selected clockwise, or by twisting the wrist counterclockwise, a pie may be sequentially selected counterclockwise.

If pie menus are layered and if a selected and then confirmed menu item has a menu in a lower layer, the pie menu in the lower layer is displayed. If the user returns from a child (lower layer) pie menu to a parent (upper layer) pie menu, the user returns to the parent pie menu by largely moving the position of the hand and then performing a selection operation. If the user makes the same motion when a root pie menu is displayed, the pie menu disappears.

While a pie menu is operated by rotating the wrist, the recognition accuracy of the motion capture system 12 is reduced due to missing of information, or the like with respect to a body area such as the tip of a hand or a leg. For this reason, it is preferable that the client reads numerical information obtained by three-dimensionally vectorizing the inclination of the wrist so as to interpolate the missing data.

As described above in detail, by adopting the gesture input system according to the present invention, an input interface that a human can operate naturally and intuitively can be provided by using a gesture, which is one of information communication means that we usually use in a casual manner, and thus using, as input information, not only two-dimensional information including the upward and downward directions and the left and right directions but also three-dimensional information additionally including the forward and backward directions (depth). In this case, by adopting an operation method similar to a natural movement, an input interface that does not require any special training and is easy to use for anyone is realized. Also, unlike a touch panel, this input interface is operable from a place remote from a panel.

The present invention is not limited to the above-mentioned embodiment and can be carried out in various ways without departing from the spirit and scope of the invention. For this reason, the above-mentioned embodiment is illustrative only in any respects and should not be construed in a limited manner. For example, the order of the above-mentioned process steps may be arbitrarily changed or any process steps may be performed simultaneously unless any contradiction occurs between processes.

While information indicating a motion of a capture target is acquired using the optical motion capture system in this embodiment, the present invention is not limited thereto. Motion information may be acquired using other methods. While motion information based on a hand gesture is acquired using the motion capture system in this embodiment, motion information based on a hand gesture may be acquired using, for example, a data glove or the like or using both the motion capture system and a data glove or the like.

While the input interface mainly using a hand gesture has been described in this embodiment, the present invention is not limited thereto. An input interface that captures movements on the whole-body can be mounted.

BRIEF DESCRIPTION OF THE DRAWINGS

FIG. 9 is a drawing showing parameters used when performing template-matching.

FIG. 10 is a template corresponding to a jump motion.

REFERENCE NUMERALS

Figure 1:
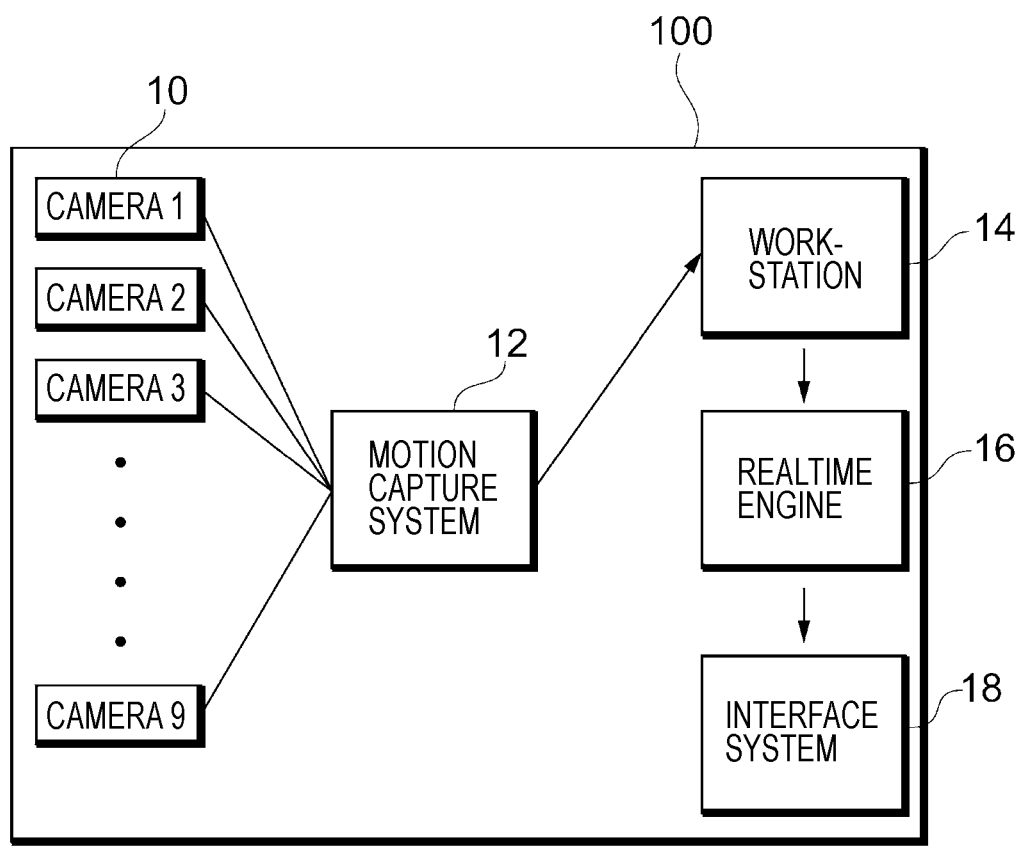
FIG. 1 is a block diagram showing an overall configuration of a gesture input system 100.

10 camera
12 motion capture system
14 workstation
16 realtime engine
18 interface system (input interface means)
20 frame number
22 data (subject name, label name, and coordinate information)
100 gesture input system

The invention claimed is:

1. A gesture input system comprising:
   motion information acquisition means for acquiring motion information of an individual based on a gesture of the individual;
   preprocessing means for performing normalization and position-coordinate conversion on motion information acquired by the motion information acquisition means, wherein the normalization is performed based at least in part of a ratio of body data of the individual that made the gesture to body data of a predetermined human body model;
   template matching means for matching, based on one or more parameters, the normalized and converted motion information against a start template and an end template to recognize a start and an end of a motion automatically, wherein if the normalized and converted motion information is matched to the start template, a motion start event is generated, further wherein the one or more parameters comprise position, velocity, acceleration, distance, and direction; and
   input interface means for generating information for operating an object on a desktop of a computer on the basis of the normalized and converted motion information as matched by the template matching means.

2. The gesture input system according to claim 1, further comprising
   template storage means for storing the start template and the end template for recognizing the motion of the individual; and
   event output means for outputting an output event on the basis of the motion information as matched by the template matching means.

3. The gesture input system according to claim 2, wherein the object includes a pie menu in which a menu item is disposed in a circular form, and a user selects any menu item in the pie menu by twisting a wrist thereof.

4. The gesture input system according to claim 3, wherein the event output means sequentially selects a menu item in the pie menu in a direction in which a user twists a wrist thereof.

5. The gesture input system according to claim 4, wherein the pie menu is layered.

6. The gesture input system of claim 1, wherein the motion information is acquired at least in part from one or more markers mounted to the individual.

7. The gesture input system of claim 6, wherein the one or more markers are configured to reflect light.

8. The gesture input system of claim 1, wherein the object on the desktop comprises a first cursor and a second cursor.

9. The gesture input system of claim 8, wherein the first cursor corresponds to a right hand of the individual and the second cursor corresponds to a left hand of the individual.

10. The gesture input system of claim 8, wherein the first cursor and the second cursor each have a normal state and a selected state, and wherein the selected state is activated by the gesture of the individual.

11. The gesture input system of claim 1, wherein operating the object on the desktop of the computer increases or decreases a window size on the desktop.

12. The gesture input system of claim 1, wherein the position-coordinate conversion is performed based at least in part on the orientation of the individual.

13. The gesture input system of claim 1, wherein another one of the motion start event is not generated until the motion information is matched with the end template.

14. A gesture input method comprising:
   acquiring motion information of an individual based on a gesture of the individual;
   performing normalization and position-coordinate conversion on the acquired motion information, wherein the normalization is performed based at least in part on a ratio of body data of the individual that made the gesture to body data of a predetermined human body model;
   matching, based on one or more parameters, the normalized and converted motion information against a start template and an end template to recognize a start and an end of a motion automatically, wherein if the normalized and converted motion information is matched to the start template, a motion start event is generated, further wherein the one or more parameters comprise position, velocity, acceleration, distance, and direction; and
   generating information for operating an object on a desktop on the basis of the normalized and converted motion information that is matched to the start template and the end template.

15. The method of claim 14, wherein matching the acquired motion information to the start template and the end template is based on one or more parameters.

16. The method of claim 15, wherein the one or more parameters comprise position, velocity, acceleration, distance, and direction.

17. The method of claim 14, wherein one or more markers are mounted to the individual, and wherein at least a portion of the motion information is acquired based on received light reflections from the one or more markers.

18. The method of claim 14, wherein operating the object on the desktop of the computer comprises increasing or decreasing a window size on the desktop.

19. The method of claim 18, wherein increasing or decreasing the window size on the desktop is based on a one-handed gesture from the individual.

20. A non-transitory computer-readable medium having computer-readable instructions stored thereon, wherein the computer-readable instructions cause a computer to:
acquire motion information of an individual based on a gesture of the individual;
perform normalization and position-coordinate conversion on the acquired motion information, wherein the normalization is performed based at least in part on a ratio of body data of the individual that made the gesture to body data of a predetermined human body model;
match, based on one or more parameters, the normalized and converted motion information against a start template and an end template to recognize a start and an end of a motion automatically, wherein if the normalized and converted motion information is matched to the start template, a motion start event is generated, further wherein the one or more parameters comprise position, velocity, acceleration, distance, and direction; and
generate information for operating an object on a desktop on the basis of the normalized and converted motion information that is matched to the start template and the end template.

21. The non-transitory computer-readable medium of claim 20, wherein the object on the desktop comprises a first cursor and a second cursor, and wherein the first cursor corresponds to a right hand of the individual and the second cursor corresponds to a left hand of the individual.

* * * * *

UNITED STATES PATENT AND TRADEMARK OFFICE
CERTIFICATE OF CORRECTION

PATENT NO. : 9,032,336 B2  
APPLICATION NO. : 12/440150  
DATED : May 12, 2015  
INVENTOR(S) : Uoi et al.

Page 1 of 1

It is certified that error appears in the above-identified patent and that said Letters Patent is hereby corrected as shown below:

In the drawings

Figure 2:
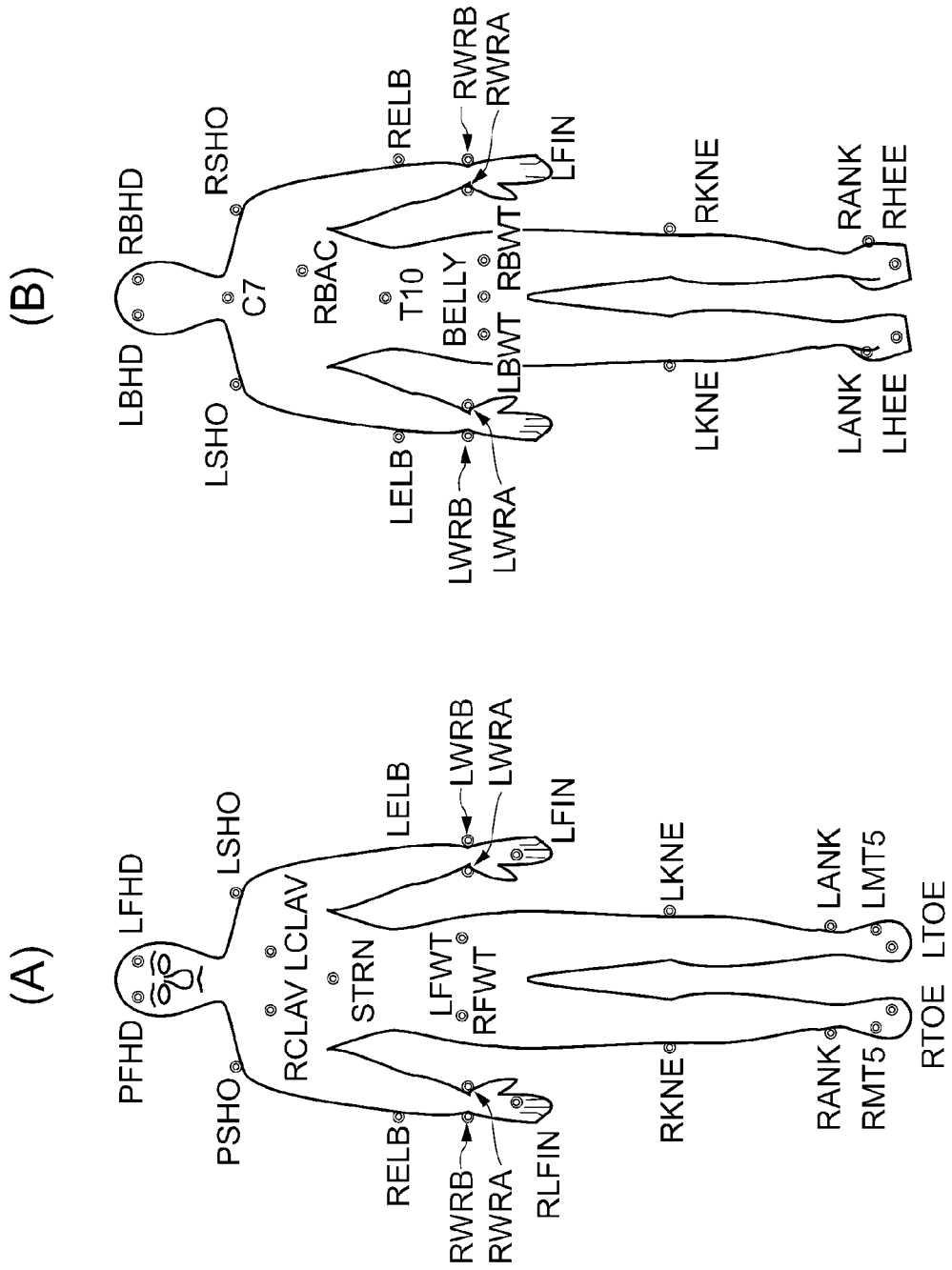
FIG. 2 includes drawings showing the disposition of markers attached to the whole-body of a capture target.
Figure 3:
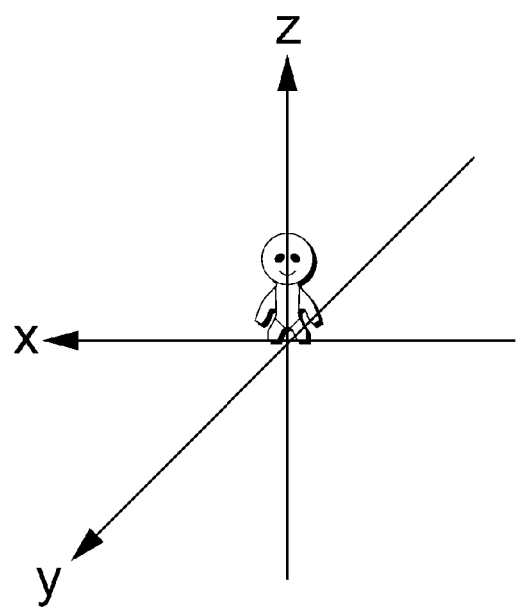
FIG. 3 is a drawing showing a coordinate system of capture data acquired by a motion capture system 12.
Figure 4:
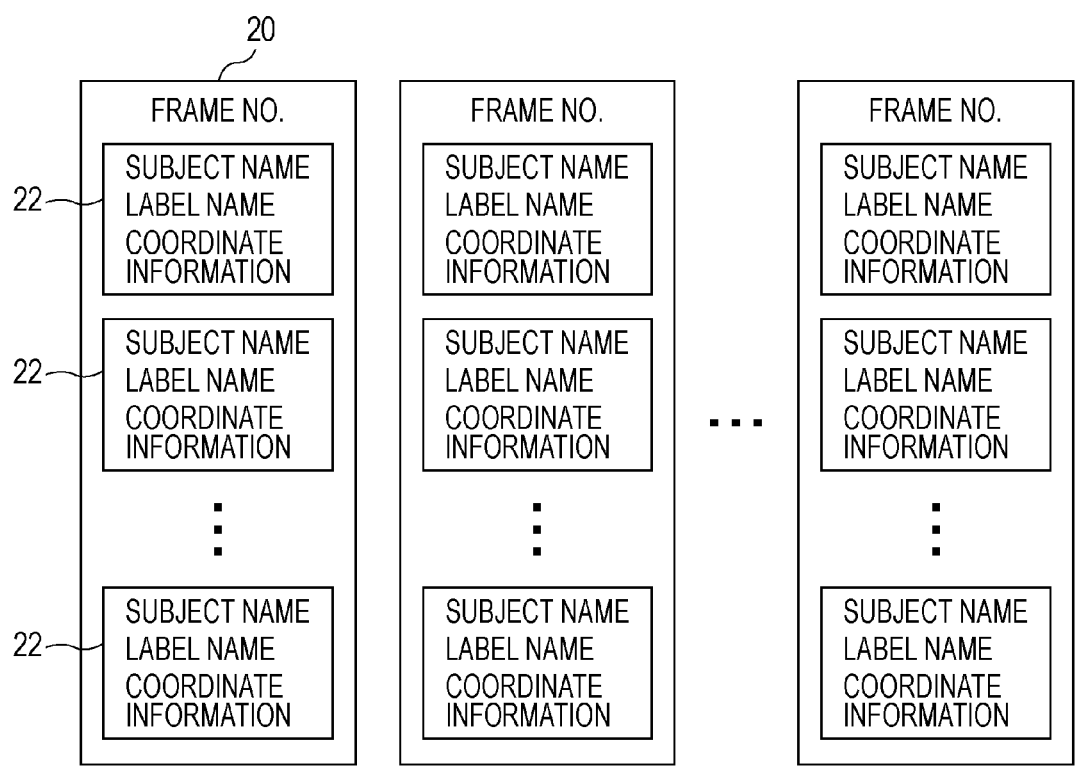
FIG. 4 is a diagram showing a structure of capture data acquired by the motion capture system 12.
Figure 5:
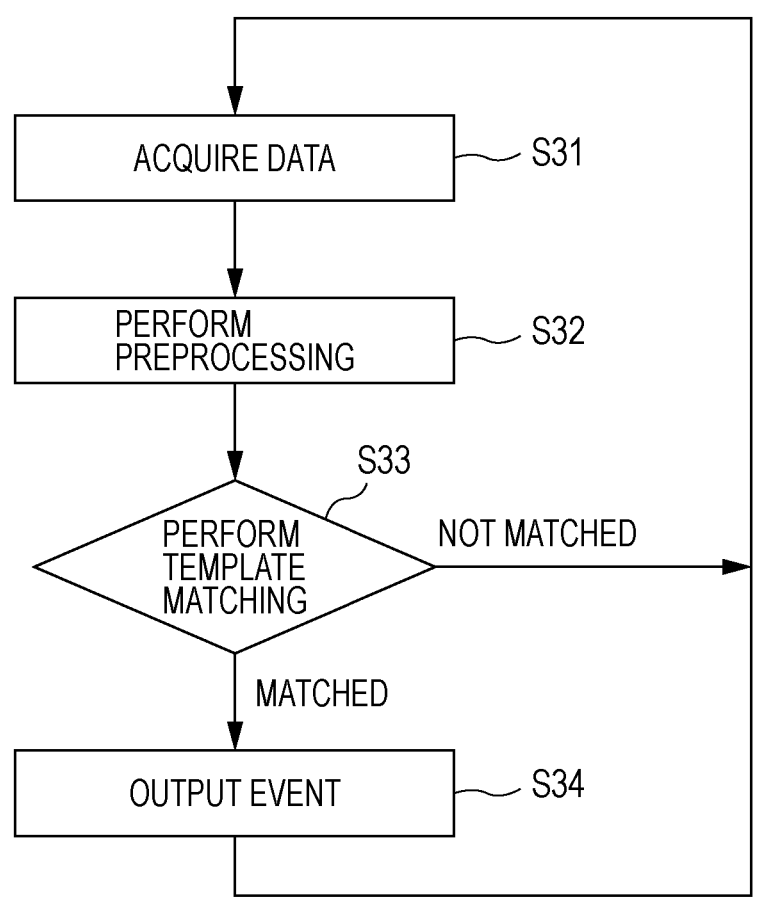
FIG. 5 is a flowchart of a motion recognition process performed by an interface system 18.
Figure 6:
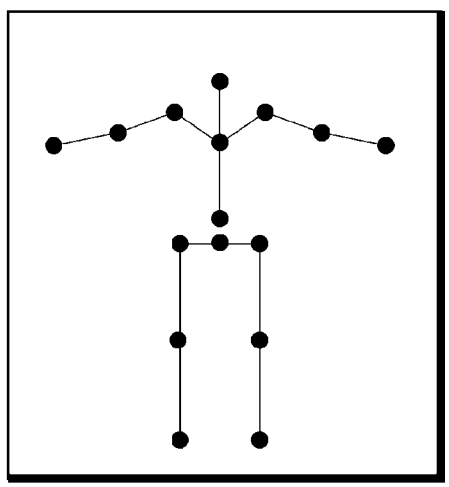
FIG. 6 includes diagrams showing examples of normalization.
Figure 6:
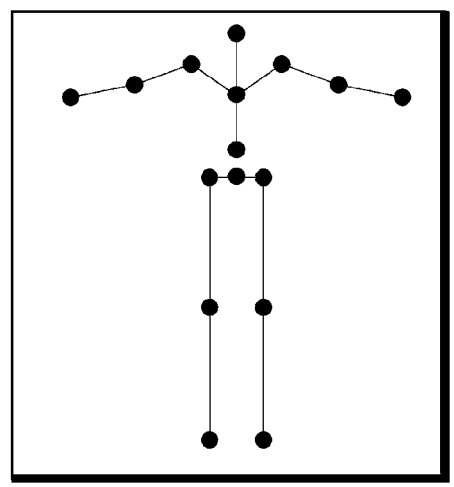
Figure 6:
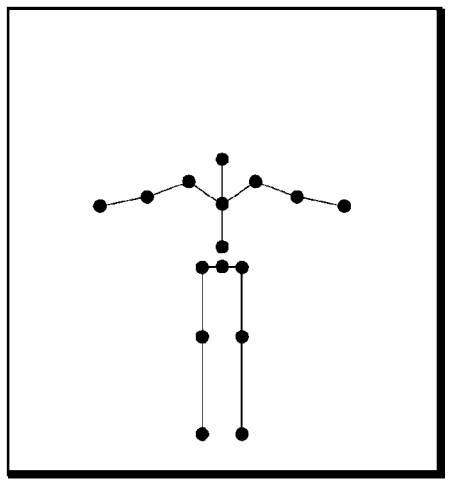
Figure 6:
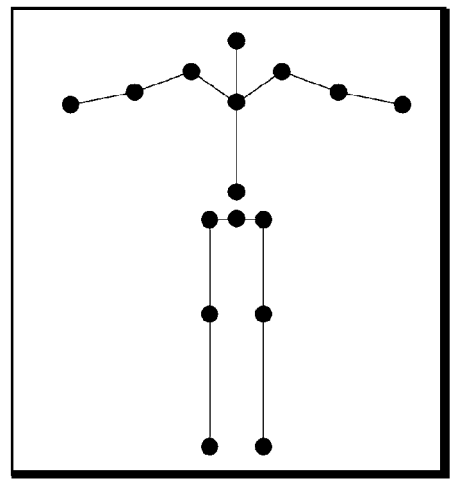
Figure 7:
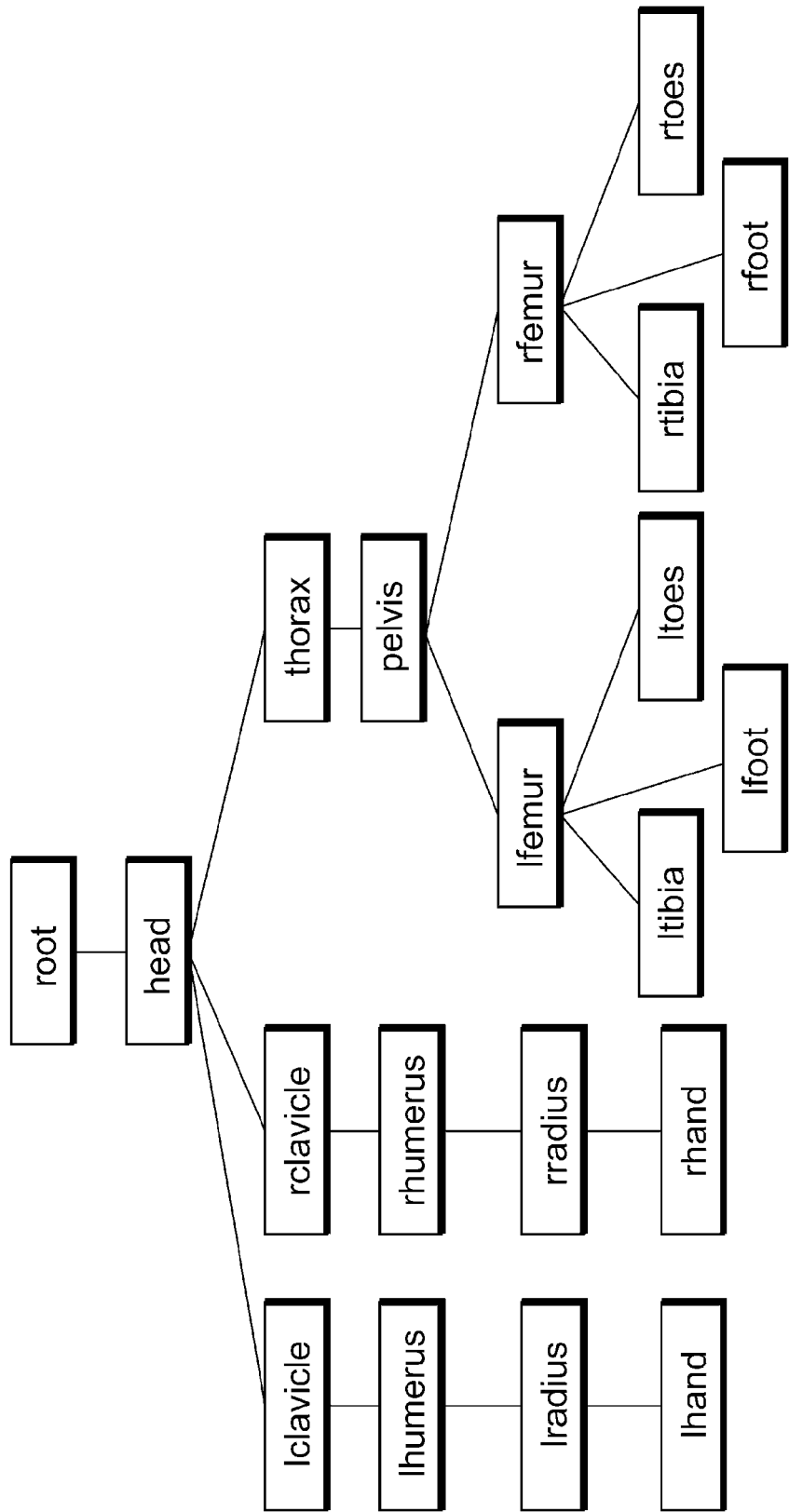
FIG. 7 is a diagram showing an example of a tree structure.
Figure 8:
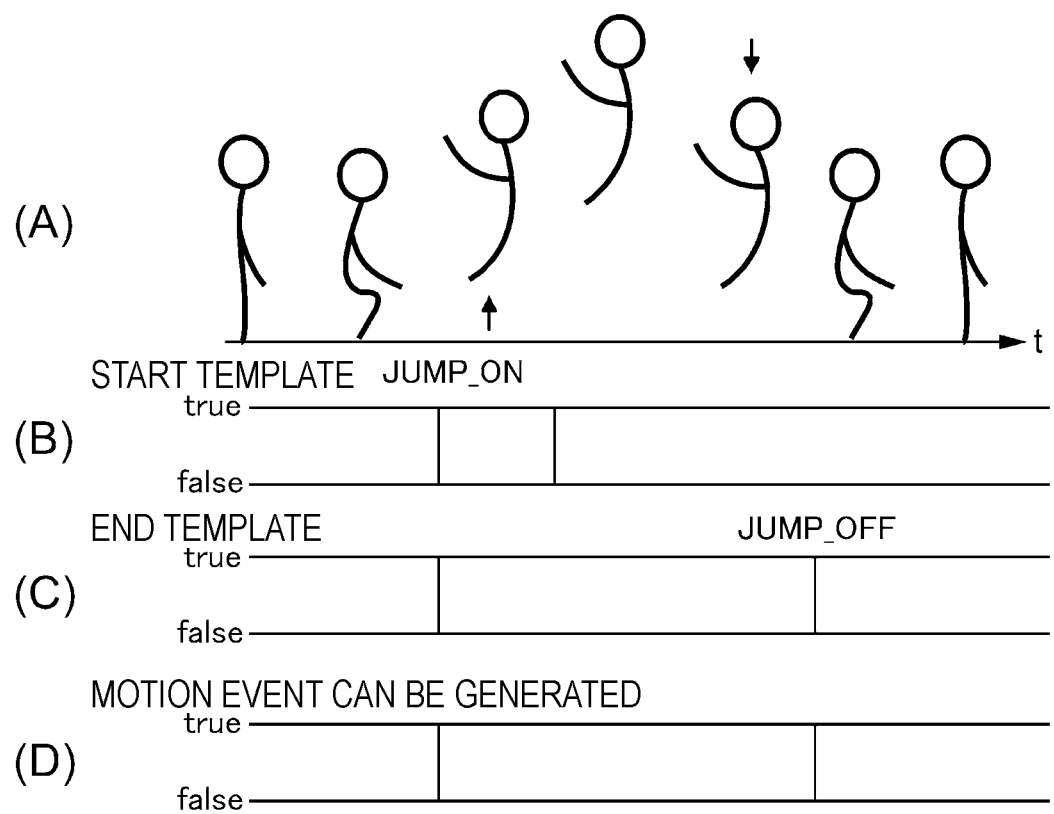
FIG. 8 includes drawings showing motions corresponding to a start template and an end template.
Figure 11:
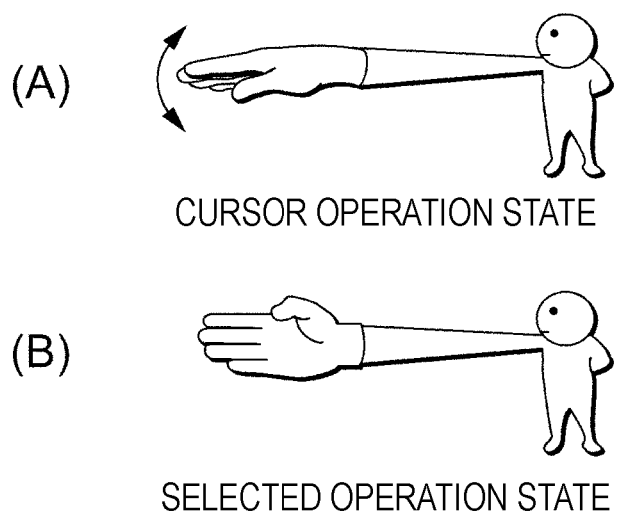
FIG. 11 includes drawings showing a cursor operation based on gesture input.
Figure 12:
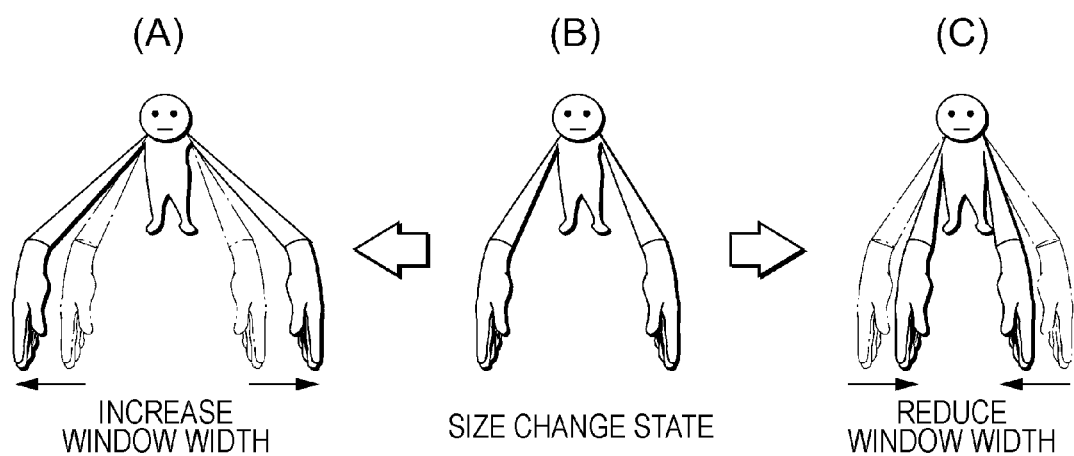
FIG. 12 includes drawings showing an operation method for changing the window size using both hands.
Figure 13:
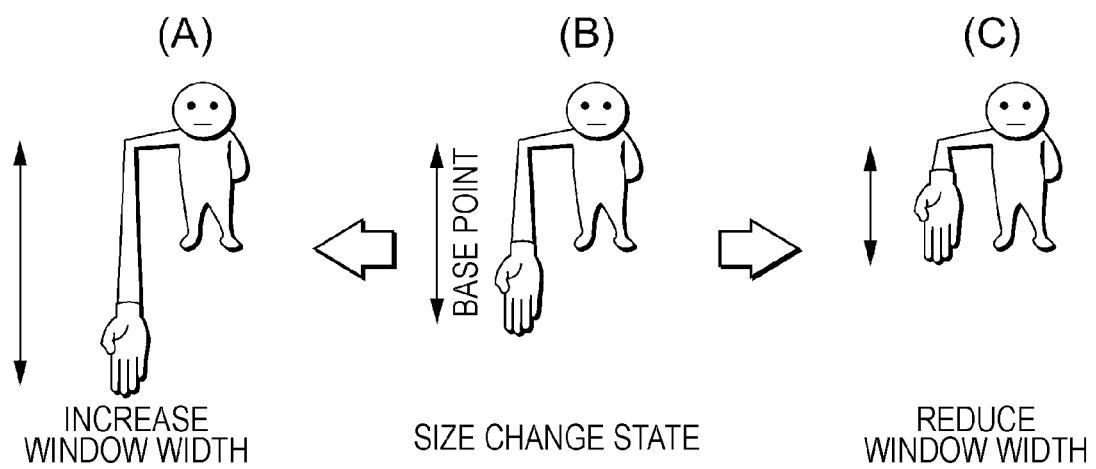
FIG. 13 includes drawings showing an operation method for changing the window size using one hand.
Figure 14:
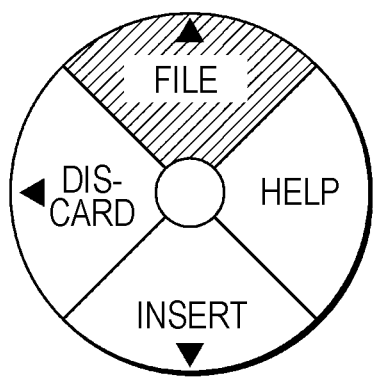
FIG. 14 includes drawings showing an example of a pie menu.
Figure 14:
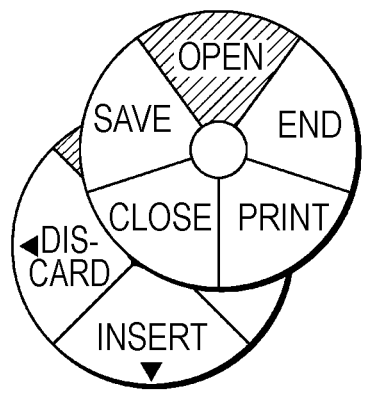
Figure 15:
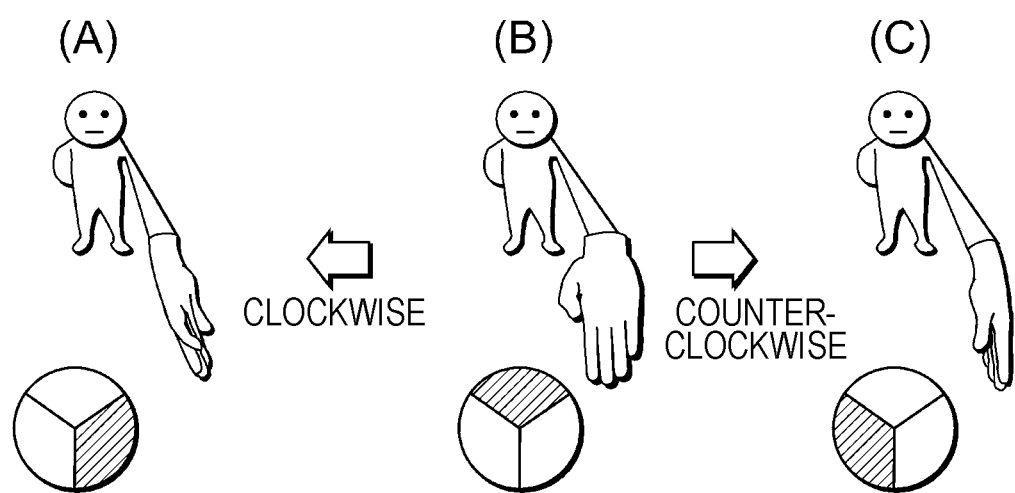
FIG. 15 includes drawings showing an operation method for selecting a menu in a pie menu.

In Fig. 2(A), Sheet 2 of 15, delete "RLFIN" and insert -- RFIN --, therefor.

In Fig. 2(B), Sheet 2 of 15, delete "LFIN" and insert -- RFIN --, therefor.

In the specification

In Column 1, Line 8, delete "35 USC §371" and insert -- 35 U.S.C. § 371 --, therefor.

In the claims

In Column 9, Line 47, in Claim 1, delete "on motion" and insert -- on the motion --, therefor.

In Column 9, Line 50, in Claim 1, delete "of a ratio" and insert -- on a ratio --, therefor.

In Column 9, Line 67, in Claim 2, delete "comprising" and insert -- comprising: --, therefor.

Signed and Sealed this  
Ninth Day of August, 2016

Michelle K. Lee  
*Director of the United States Patent and Trademark Office*